(12) United States Patent
Miyake et al.

(10) Patent No.: US 8,472,079 B2
(45) Date of Patent: Jun. 25, 2013

(54) IMAGE PROCESSING APPARATUS, METHOD, AND PROGRAM PRODUCT FOR DISPLAY AND CONTROL OF COLOR MATERIAL AMOUNT USED IN SEPERATED OBJECT AREAS

(75) Inventors: Nobutaka Miyake, Yokohama (JP); Yusuke Hashii, Chofu (JP); Makoto Torigoe, Tokyo (JP); Ryosuke Iguchi, Kawasaki (JP); Tetsuya Suwa, Yokohama (JP); Minako Kato, Kawasaki (JP); Hiromitsu Akiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 12/780,636

(22) Filed: May 14, 2010

(65) Prior Publication Data
US 2010/0290067 A1 Nov. 18, 2010

(30) Foreign Application Priority Data
May 18, 2009 (JP) .................................. 2009-119683

(51) Int. Cl.
*H04N 1/56* (2006.01)
*H04N 1/60* (2006.01)

(52) U.S. Cl.
USPC ............ 358/2.1; 358/502; 358/518; 358/537; 358/538

(58) Field of Classification Search
USPC ............... 358/1.9, 2.1, 3.21, 3.24, 3.26, 3.27, 358/501, 502, 504, 518–521, 527, 530–532, 358/537, 538; 347/5, 9–15, 19
See application file for complete search history.

(56) References Cited

U.S. PATENT DOCUMENTS 7,038,812 B2 * 5/2006 Hashimoto et al. ............ 358/1.9
7,298,522 B2 * 11/2007 Sugimoto ..................... 358/502

FOREIGN PATENT DOCUMENTS

| JP | 2000-132006 | | 5/2000 |
|---|---|---|---|
| JP | 2001-63189 | | 3/2001 |
| JP | 2004-167755 | | 6/2004 |
| JP | 2005-017562 | A | 1/2005 |
| JP | 2005-250302 | A | 9/2005 |
| JP | 2006-227444 | | 8/2006 |
| JP | 2010-200222 | A | 9/2010 |
| JP | 2012061701 | A * | 3/2012 |

* cited by examiner

*Primary Examiner* — Scott A Rogers
(74) *Attorney, Agent, or Firm* — Canon USA Inc IP Division

(57) ABSTRACT

For a printing apparatus which saves on a color material, an image processing apparatus is realized which enables a user to incur printing costs only for necessary information and necessary areas in a print product. For this purpose, there is provided an image processing apparatus including a separation unit configured to analyze and separate print information into text, photograph, and graphic constituent elements, a display unit configured to display information about a color material used amount to be used in printing for each of the separated constituent elements, and a setting unit configured to allow a user to set a change in the color material used amount for each of the separated constituent elements.

6 Claims, 13 Drawing Sheets

IMAGE PROCESSING APPARATUS, METHOD, AND PROGRAM PRODUCT FOR DISPLAY AND CONTROL OF COLOR MATERIAL AMOUNT USED IN SEPERATED OBJECT AREAS

BACKGROUND OF THE INVENTION

1. Field of the Invention

The present invention relates to an image processing apparatus capable of printing while saving on a color material used amount.

2. Description of the Related Art

For an image recording apparatus (printer) which outputs image information by connecting to a host computer, and a copying machine (copier) which is used as a stand alone machine, there have been various discussions for color material saving methods to reduce a print product unit cost (running cost) per sheet by saving on the used amount of ink and toner, which serve as the color material for recording on a paper sheet.

Japanese Patent Application Laid-Open No. 2000-132006 discusses a method which has multiple toner saving modes for different types of images, such as texts, graphics, and photographs, constituting print data. In this method, effective print savings can be realized by automatically selecting the mode based on the type of the print data. Further, Japanese Patent Application Laid-Open No. 2000-132006 also discusses a method in which a specific mark in an image, such as "internal use only" and "copying not permitted" is determined, and image quality is compulsorily reduced to perform printing when such a specific mark is present. In addition, Japanese Patent Application Laid-Open No. 2000-132006 discusses a method in which processing is switched to a toner saving mode based on a remaining amount of toner.

Japanese Patent Application Laid-Open No. 2004-167755 discusses a method which classifies areas in a bitmap image into black text portions (objects) and other areas (objects), and associates and stores identification information indicating a classification attribute with the position of each object. Then, based on the identification information indicating a classification attribute for each object position, a weighting is applied on the toner consumption amount when the bitmap image is printed.

Japanese Patent Application Laid-Open No. 2006-227444 discusses a printing apparatus which includes a unit for displaying a toner consumption amount so that a user can quantitatively understand the toner consumption amount and the printing costs, and which performs printing in an image quality mode based on a selection instruction made by the user.

However, the above described conventional techniques have the following drawbacks.

In Japanese Patent Application Laid-Open No. 2000-132006, when data is printed, a good printing result can be obtained by selecting an optimum toner saving mode based on attributes of an image which forms the print data. In Japanese Patent Application Laid-Open No. 2004-167755, even better toner saving can be expected, because switching of a lookup table (LUT) is performed locally by identifying the object attributes. However, regarding setting of a color material used amount of each object, Japanese Patent Application Laid-Open Nos. 2000-132006 and 2004-167755 merely have a fixed setting table is stored in advance in the image processing apparatus. Neither of these documents discusses a configuration which reflects user's preferences or printing intentions for each output print product.

In the method discussed in Japanese Patent Application Laid-Open No. 2006-227444, a setting which reflects user's printing intentions from the perspective of printing costs is possible. In this method, the user sets an upper limit for printing costs, so that printing can be performed at the highest image quality under this upper limit. However, even in this method, when trying to print a document including a mixture of natural images and characters, a saving ratio in the natural image areas and in the character area cannot be freely set. Further, a saving ratio weighting cannot be applied based not only on the importance of portions between different objects, but also within the same object. More specifically, when there are multiple natural images present, it is not possible to set just one of those images to a saving mode, and not possible to set portions other than the necessary paragraphs in the character areas to a saving mode.

With the current spread of the Internet, increase in opportunities for web page screen printing will continue to rise. In web page screen printing, there are many cases in which areas that a user finds necessary are intermingled with unnecessary areas. Use of a large amount of color material for unnecessary areas contrary to the user's intentions leads to increase running costs and user dissatisfaction.

More specifically, methods for resolving the following conventional drawbacks, which are based on the perspective of ease of use for the user, do not exist.

Although a user wishes to incur printing costs only for necessary information and necessary areas in a print product, it is unclear what printing costs are incurred for each piece of information and each area.

Although the user wishes to incur costs only for the necessary information and the necessary areas in the print product, the weighting of the color material saving amount cannot be freely set within a page or within a job.

Although setting of photograph priority and character priority can be realized even in the conventional art, the printing costs cannot be incurred so as to reflect merits of each photograph when there are a plurality of photographs present, or merits of each paragraph in a text area.

The user cannot estimate a print image quality of an output product when printing is set to color material saving mode.

The user cannot set to optimum printing in advance because it is impossible to comprehend a relationship between a finished image quality and printing costs.

SUMMARY OF THE INVENTION

According to an aspect of the present invention, an image processing apparatus includes a separation unit configured to analyze and separate print information into text, photograph, and graphic constituent elements, a display unit configured to display information about a color material used amount to be used in printing for each of the separated constituent elements, and a setting unit configured to allow a user to set a change in the color material used amount for each of the separated constituent elements.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
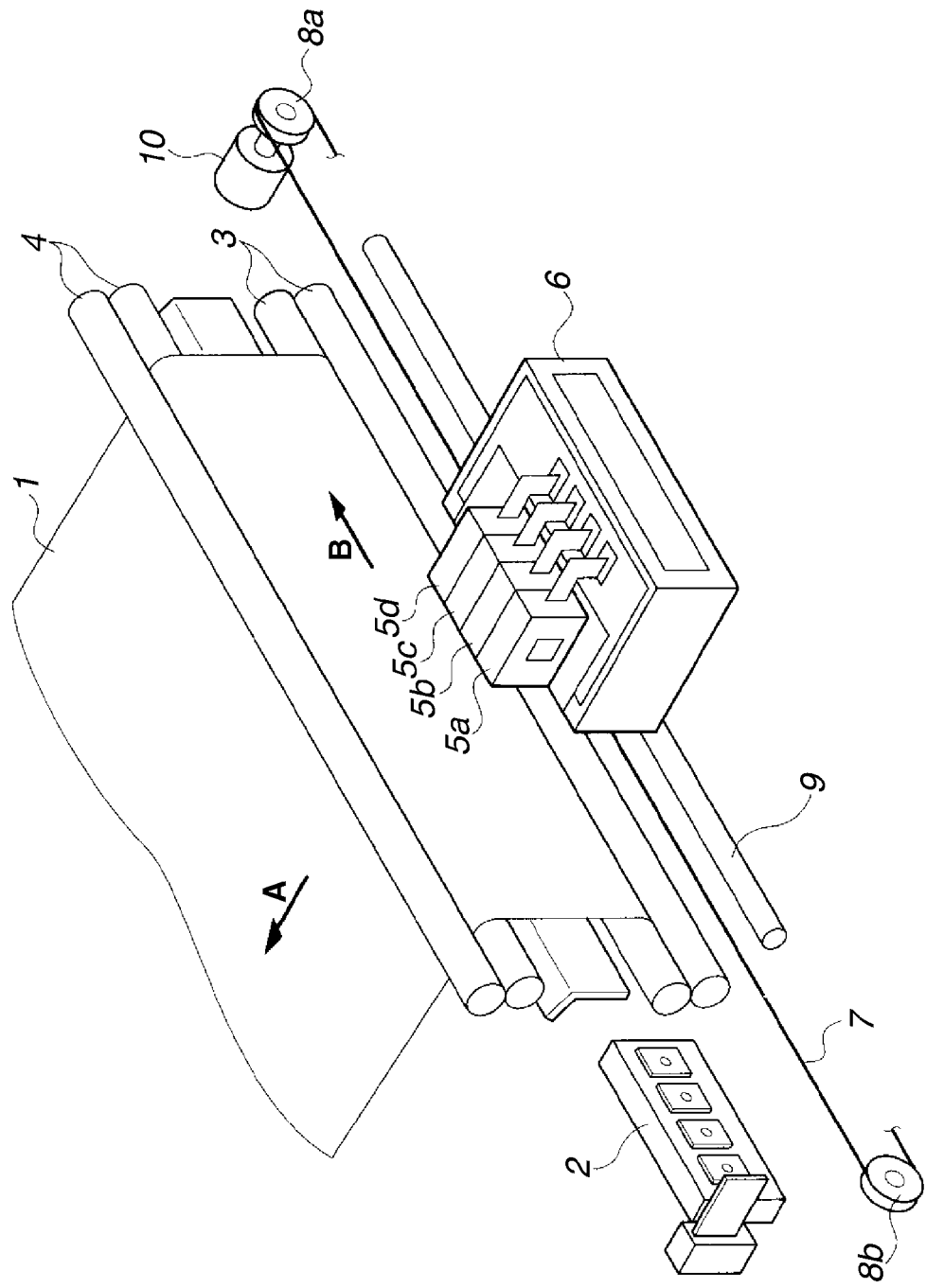
FIG. 1 illustrates an example of an inkjet recording apparatus which realizes an image processing apparatus according to the present invention.

FIG. 1 illustrates an example of an inkjet recording apparatus which can be applied in the present invention. A recording sheet 1 is made from paper or plastic. A plurality of the recording sheets 1 is stacked on a cassette or the like, and is fed one at a time by a feeding roller (not illustrated). The recording sheet 1 is conveyed in a direction indicated by an arrow A by a pair of first conveyance rollers 3 and a pair of second conveyance rollers 4 which are arranged a fixed interval apart and are each driven by a stepping motor (not illustrated).

An inkjet type recording head 5 for recording on the recording sheet 1 is configured from an ink discharge head and ink tanks. Ink is supplied from a K ink tank 5a, a C ink tank 5b, an M ink tank 5m, and a Y ink tank 5d to the not-illustrated ink discharge head which is provided on a surface directly facing the recording sheet 1. The ink is discharged from a nozzle based on an image signal. The recording head 5 is mounted on a carriage 6. A carriage motor 10 is coupled with the carriage 6 via a belt 7 and pulleys 8a and 8b. In other words, the carriage 6 is configured to scan back and forth along a guide shaft 9 by a drive from the carriage motor 10.

In this configuration, the recording head 5 moves in a direction indicated by an arrow B and records an ink image by discharging the ink on the recording sheet 1 based on an image signal. At the same time, the conveyance roller pairs 3 and 4 drive and convey the recording sheet 1 in the direction of arrow A in a one line amount. By repeating these operations, predetermined recording is performed on the recording sheet 1. In addition, when necessary the recording head 5 is returned to a home position to have clogged nozzles unclogged by an ink recovery apparatus 2.

In the above described exemplary embodiment, an inkjet recording apparatus capable of discharging four color inks is used. However, the present invention is not limited to this configuration. The present invention can be effectively applied as long as an image having different color tones can be expressed using a plurality of color materials. For example, the configuration may include the same types of ink with different cyan and magenta concentrations. In addition, special colors such as red, green, orange and the like may be used. Still further, the configuration may include an achromatic ink (gray ink). A configuration including a plurality of achromatic inks in different concentrations or color tones may also be used. Moreover, other than an inkjet recording apparatus, an electrophotographic recording apparatus using an electrophotographic technique may also be applied.

Figure 2:
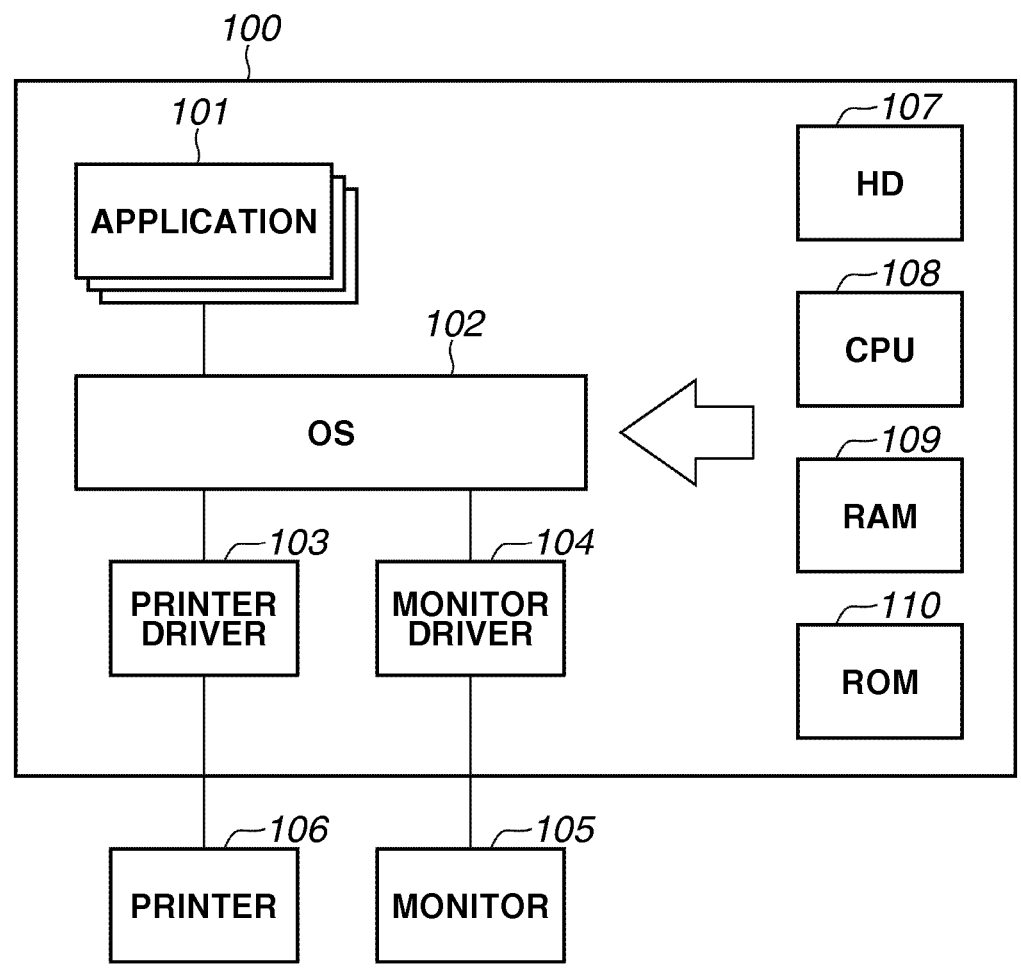
FIG. 2 is a block diagram illustrating main parts of the image processing apparatus according to the present invention.

FIG. 2 is a block diagram illustrating a printing system configured by an inkjet printer according to the above described present exemplary embodiment and a host computer which controls the inkjet printer. The present printing system includes, basically, a host computer 100, a printer 106, and a monitor 105. More specifically, an inkjet type printer 106 and the monitor 105, for example, are connected to the host computer 100, so that bidirectional communication between the inkjet type printer 106 and the monitor 105 can be established.

The host computer 100 includes an operating system (OS) 102 and an application 101, such as a word processor, a spreadsheet, image processing, Internet browser and the like, for performing various kinds of processing under the control of the OS 102. The host computer 100 also includes a printer driver 103 which generates print data by processing various groups of rendering commands (image rendering command, text rendering command, graphic rendering command) which are issued by the application 101 and represents an output image, and a monitor driver 104 which processes the various groups of rendering commands issued by the application 101 and displays the resultant image on the monitor 105.

Further, the host computer 100 includes a central processing unit (CPU) 108, a hard disk driver (HD) 107, a random access memory (RAM) 109, a read-only memory (ROM) 110 and the like. More specifically, the various types of application software are stored in advance in a hard disk driven by the hard disk driver 107 or the ROM 110. The CPU 108 reads the application software, and performs calculation processing. The RAM 109 is used as a work area for signal processing execution by the CPU 108.

In the print system having the above configuration, based on a display image displayed on the monitor 105 by the application 101, a user can generate image data formed from text data classified as text such as characters, graphic data classified as a graphic such as a drawing, and picture image data classified as a natural image.

When the user issues an instruction to print the generated image data, the application 101 transmits a print output request to the OS 102 and issues to the OS 102 a group of rendering commands of the output image in which a graphic data portion is configured as a graphic rendering command and a picture image data portion is configured as a image rendering command. The OS 102 receives the print output request, and issues a group of rendering commands to the printer driver 103 corresponding to the printer which will perform the printing.

The printer driver 103 processes the print request and the group of rendering commands input from the OS 102 to generate print data in a format which the printer 106 can print.

Then, the printer driver 103 transfers the generated print data to the printer 106. If the printer 106 is a raster printer, the printer driver 103 sequentially performs image correction processing on the rendering commands from the OS 102 and sequentially rasterizes the rendering commands in an RGB 24-bit page memory. After all of the rendering commands have been rasterized, the contents of the RGB 24-bit page memory are converted into a data format which the printer 106 can print, such as CMYK data, and the converted data is transferred to the printer.

Figure 3:
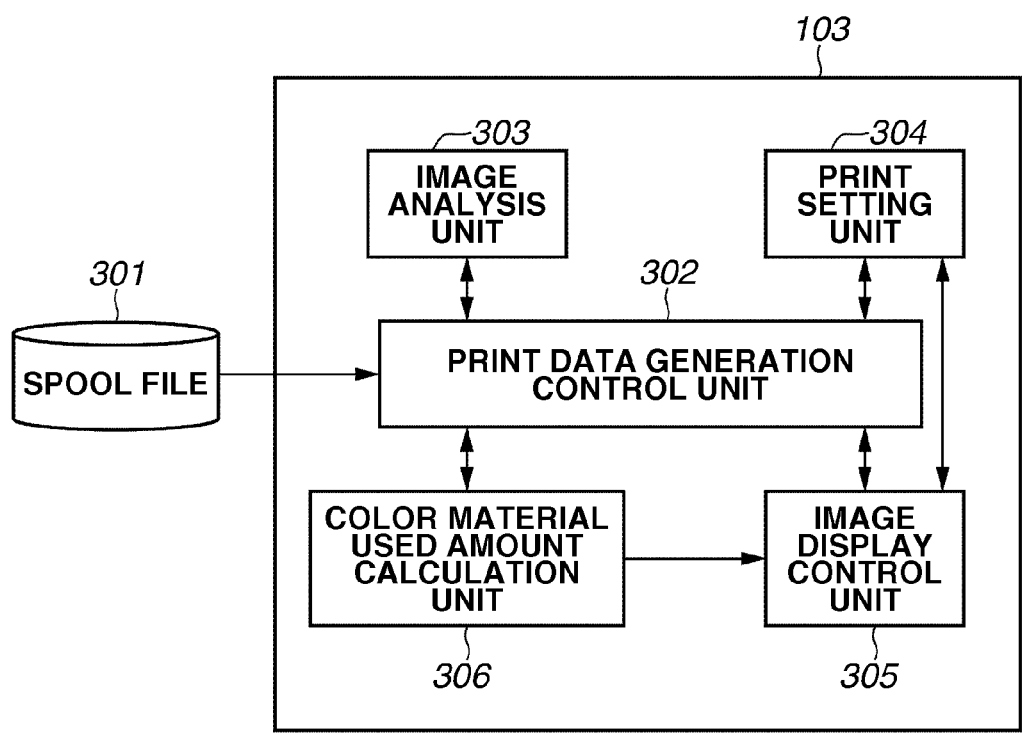
FIG. 3 is a block diagram illustrating main parts of a printer driver illustrated in FIG. 2.

Next, processing of the printer driver 103 according to the present exemplary embodiment will be described in more detail. FIG. 3 illustrates a configuration of the printer driver 103. A spool file 301 managed by the OS 102 is stored in a hard disk or the like as print data generated by the application. A print data generation control unit 302 has a function of rasterizing the spool file 301 into picture data, and a function of generating print data which can be processed by the printer. An image analysis unit 303 has a function of identifying an image attribute (hereinafter, referred to as "object") of a natural image area, a text portion area, and a graphic portion area based on image information rasterized to the picture data, and specifying coordinate information where each object is positioned. A print setting unit 304 has a function of controlling the entire user interface of the printer driver 103, such as receiving settings of various printing conditions from the user. An image display control unit 305 controls all of various displays relating to a preview of the print data and driver settings generated by the print data generation control unit 302. As discussed in Japanese Patent Application Laid-Open No. 07-325693, a preview function in the printer driver has been in use for a long time. A color material used amount calculation unit 306 has a function of calculating a local color material used amount in a region designated in the print data generated by the print data generation control unit 302.

The various blocks configuring the above described printer driver 103 realize smooth operation on the host computer by transmitting and receiving data to and from the OS 102 as necessary.

An operating procedure of the printer driver 103 will be described in more detail below.

The print data generation control unit 302 will be described in more detail.

Figure 4:
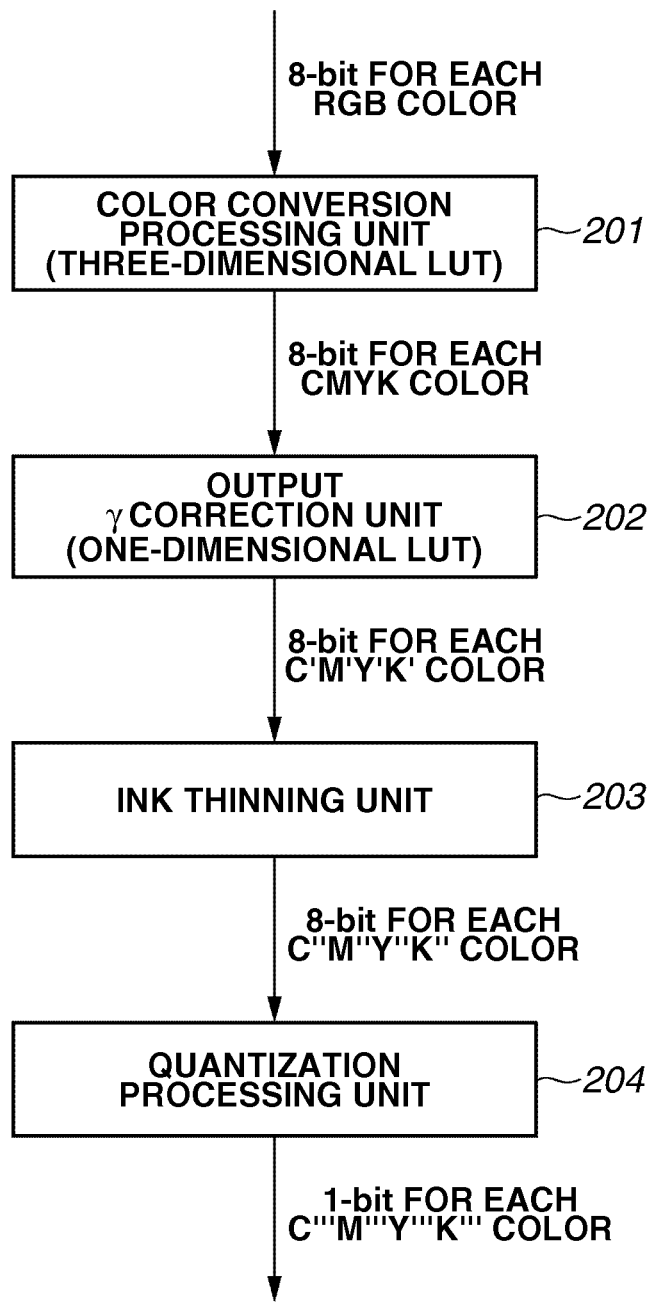
FIG. 4 is a flowchart illustrating a part of an operating procedure of a print data generation control unit illustrated in FIG. 3.

FIG. 4 is a block diagram illustrating the image processing performed by the print data generation control unit 302. In the present exemplary embodiment, 8-bit (256 gradations) image data represented by red (R), green (G), and blue (B) brightness signals corresponding to the rendering commands input from the OS 102 is converted into 1-bit recording data for each of cyan (C), magenta (M), yellow (Y) and black (K).

First, the 8-bit data for each RGB color forming a color image is converted into 8-bit data for each CMYK color to match output colors of the printer based on a three-dimensional lookup table (LUT) by a color conversion processing unit 201. This processing converts the input RGB colors into output CMYK colors. Generally, input data is an additive color mixture of the three primary colors (RGB) from a light-emitting body such as a display. However, since printers use a CMYK color material, the above conversion processing is performed.

The three-dimensional LUT used in the color processing discretely stores data. Values between the stored data are determined by interpolation processing. The interpolation processing is a known technology, and thus a detailed description is omitted here.

The 8-bit data for each CMYK color which has been subjected to color conversion processing is then subjected to output γ correction based on a one-dimensional LUT by an output γ correction unit 202 to generate C', M', Y', and K' 8-bit data. A relationship between the number of print dots per unit area and output characteristics (reflection density etc.) is often a non-linear relationship. Therefore, by subjecting to the output γ correction, a linear relationship between a CMYK 8-bit input level and the output characteristics at that time is guaranteed.

The C', M', Y', and K' 8-bit data after the output γ correction is subjected to ink thinning processing as necessary for each image area by an ink thinning unit 203 to generate 8-bit data for each of C", M", Y", and K".

In the above description, the operations of a color processing unit are described, in which the 8-bit data for each input RGB color is converted into 8-bit data for each of the color material CMYK colors that the output device has.

A color recording apparatus according to the exemplary embodiment is a binary recording apparatus. Therefore, the 8-bit data for each CMYK color is subjected to quantization processing into binary data for each color by a quantization processing unit 204. As the quantization method, an error diffusion method or a dither method, which are conventionally known, is used.

An optimum conversion method for the above described color conversion processing unit 201, the output γ correction unit 202, and the quantization processing unit 204 normally depends on a type of print medium, a type of image to printed and the like. Especially, the lookup tables used by the color conversion processing unit 201 and the output γ correction unit 202 are usually prepared for each kind of recording medium.

In the above, although the print system connected to the host computer 100, the printer 106, and the monitor 105 is described, the present invention may also be realized by a multifunctional printing apparatus which integrates these units.

Further, although processing for thinning and adjusting the amount of each CMYK ink color is used for the ink thinning processing, the present invention is not limited to adjustment CMYK. The processing may be performed such that the respective RGB brightness levels are appropriately adjusted prior to the color conversion processing unit, so that a thinning effect is obtained that is appropriate for an ultimate ink used amount. In addition to CMYK, printer systems employing ten or more colors also exist. In such a system, no matter how many ink colors there are, the correction processing can still simply be performed for RGB three plains. Therefore, it is possible to save on a processing speed and a memory used amount.

The exemplary embodiment will be described in more detail for the above described printer system.

Figure 5:
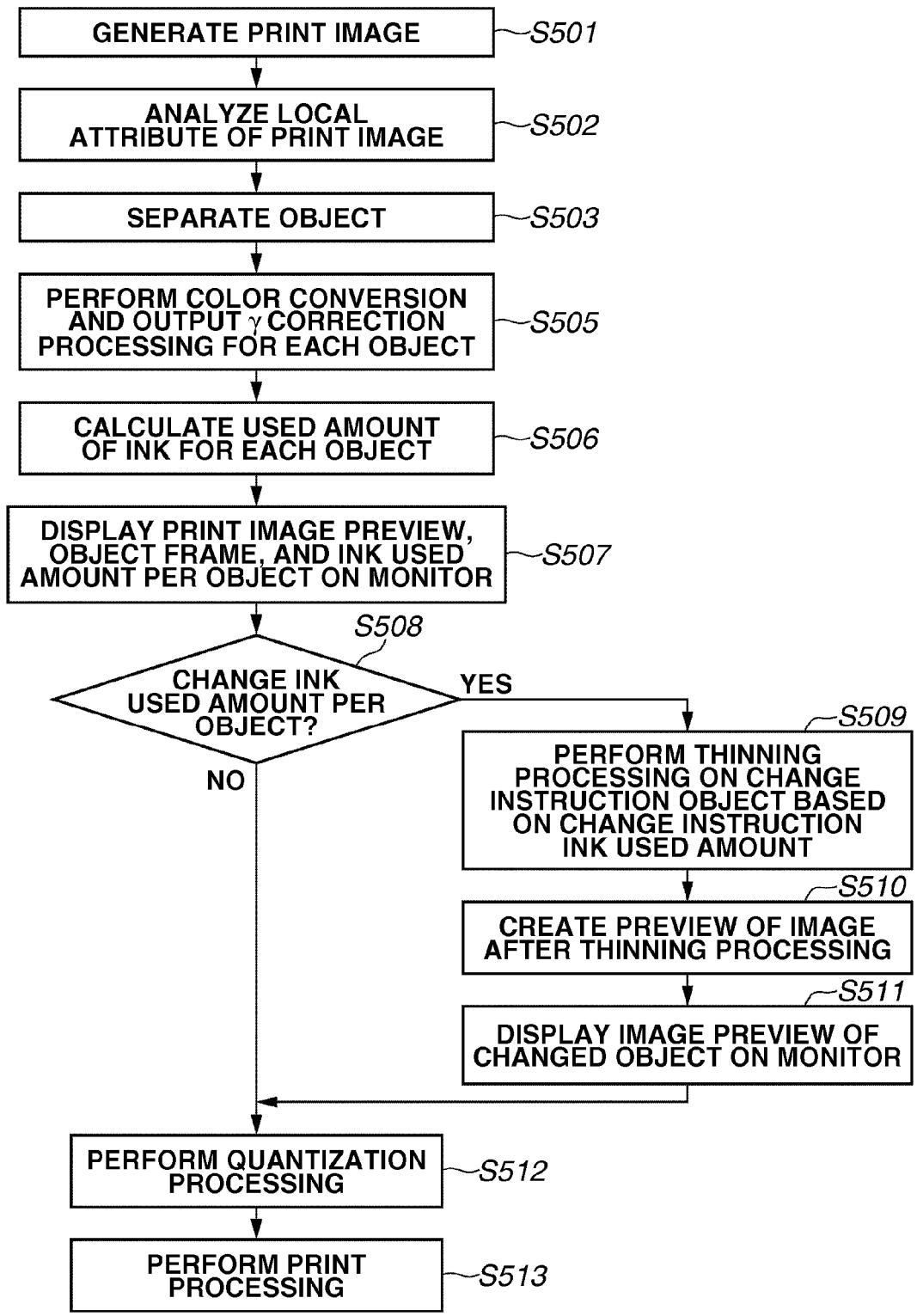
FIG. 5 is a flowchart illustrating an operating procedure of the printer driver illustrated in FIG. 2.

FIG. 5 is a flowchart illustrating an operating procedure controlled by the printer driver 103 on the host computer according to the present exemplary embodiment.

Step S501 is a print image generation process. In step S501, the print data generation control unit 302 rasterizes a spool file generated by application software into an RGB 24-bit page memory.

In step S502, the image analysis unit 303 analyzes spatial and local attributes in the print image. The print image can be classified by the image analysis unit 303 into constituent elements such as text areas in which character strings are laid out, graphic areas in which drawings and tables are illustrated, and photograph areas in which natural images are formed. In the analysis process, the print image is scanned one pixel at a time from a leading pixel, and a distribution state of pixel values in a window near a target pixel is successively evaluated. In the evaluation process, pixel attributes can be analyzed even more accurately by evaluating whether pixel value distribution indicate edge portion characteristics, or flat portion characteristics. Even if it is evaluated that an edge is present, it can be further evaluated whether the edge is specific to a natural image or an artificially generated edge. The analysis process can also be performed utilizing frequency analysis. Further, the analysis step can be performed within a text area by detecting a margin and analyzing paragraphs based on a size of the margin area, or by analyzing the attributes of each paragraph.

If a layout configuration of a print document is created by application software, the attributes themselves may be transmitted from the application software.

Although the analysis method of step S502 is not specified in the present exemplary embodiment, it is necessary to at least analyze between areas including characters and line drawings and areas which do not include characters and line drawings.

In step S503, an object separation process is performed by the image analysis unit 303. Based on attribute information about each pixel analyzed in step S502, the whole print image is separated into a plurality of object areas. In this process, a start coordinate and an end coordinate when each separated object is enclosed in a rectangular area are identified. Further, if analysis results indicate the same attribute across the whole print image, the print image is treated as a single object.

Identified coordinate information is transmitted to the print data generation control unit 302. Then, in step S505, the color conversion processing (step 201 in FIG. 4) and the output γ correction processing (step 202 in FIG. 4) are performed on each object.

In step S506, the color material used amount calculation unit 306 calculates the used amount of ink for each object. The total ink used amount of the object is calculated by adding a predetermined pixel amount of the C', M', Y', and K' data for each pixel after the output γ correction processing in step S505 to each object. For example, when the used amount of ink for an object enclosed by a rectangular area having a start coordinate (x1, y1) and an end coordinate (x2, y2) is calculated, the total ink used amount (Total_Ink) is calculated as follows.

$$\text{Total\_Ink} = \sum_{x=x1}^{x2} \sum_{y=y1}^{y2} (C'(x,y) + M'(x,y) + Y'(x,y) + K'(x,y))$$

In step S507, an image which has been subjected to the output γ correction processing by the print data generation control unit 302, an object frame generated based on the coordinate data analyzed by the image analysis unit 303, and the ink used amount data calculated by the color material used amount calculation unit 306 are displayed by the image display control unit 305. Since the image after the output γ correction processing is CMYK information, it is preferred to output the image by reversely converting the data into an RGB space which is an optimum color space for monitor display.

Figure 6:
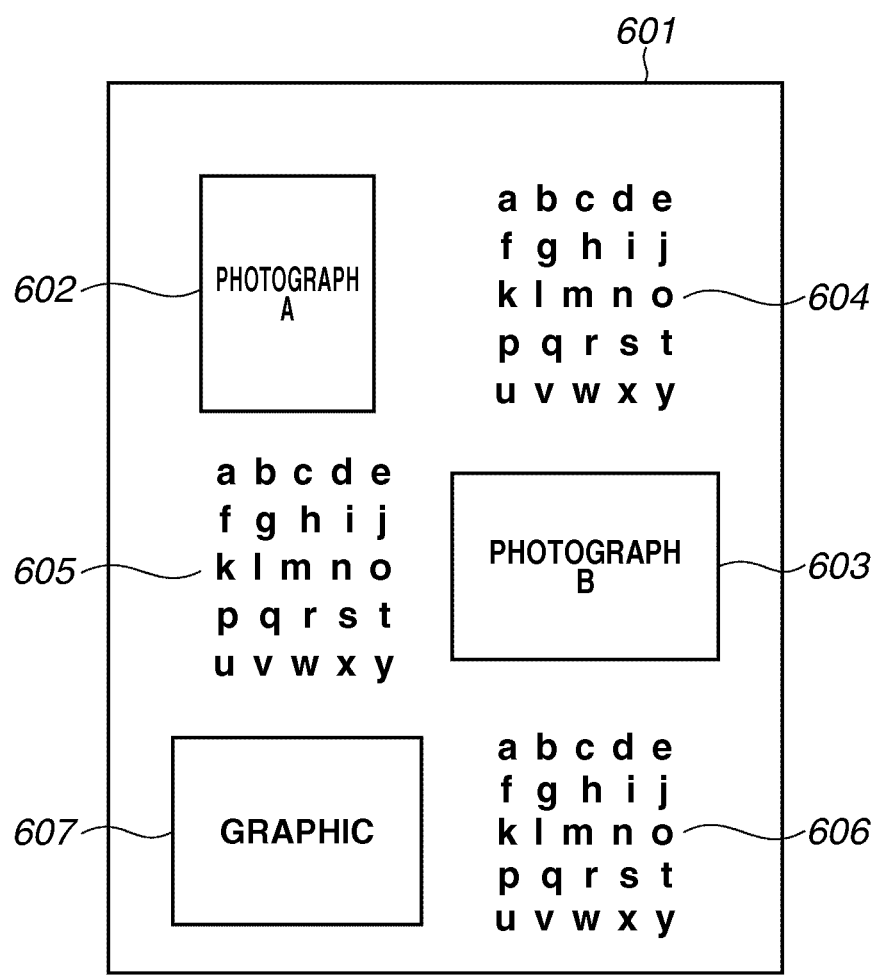
FIG. 6 illustrates an example of print data.

A display example will be described based on FIGS. 6 and 7. FIG. 6 illustrates an example of a print image generated by an application. In FIG. 6, there are six types of objects (constituent elements), namely a photograph A 602, a photograph B 603, a text area A 604, a text area B 605, a text area C 606, and a graphic area A 607, present in a printing sheet frame 601. The user issues a print command for this document using the user interface of the application.

Figure 7:
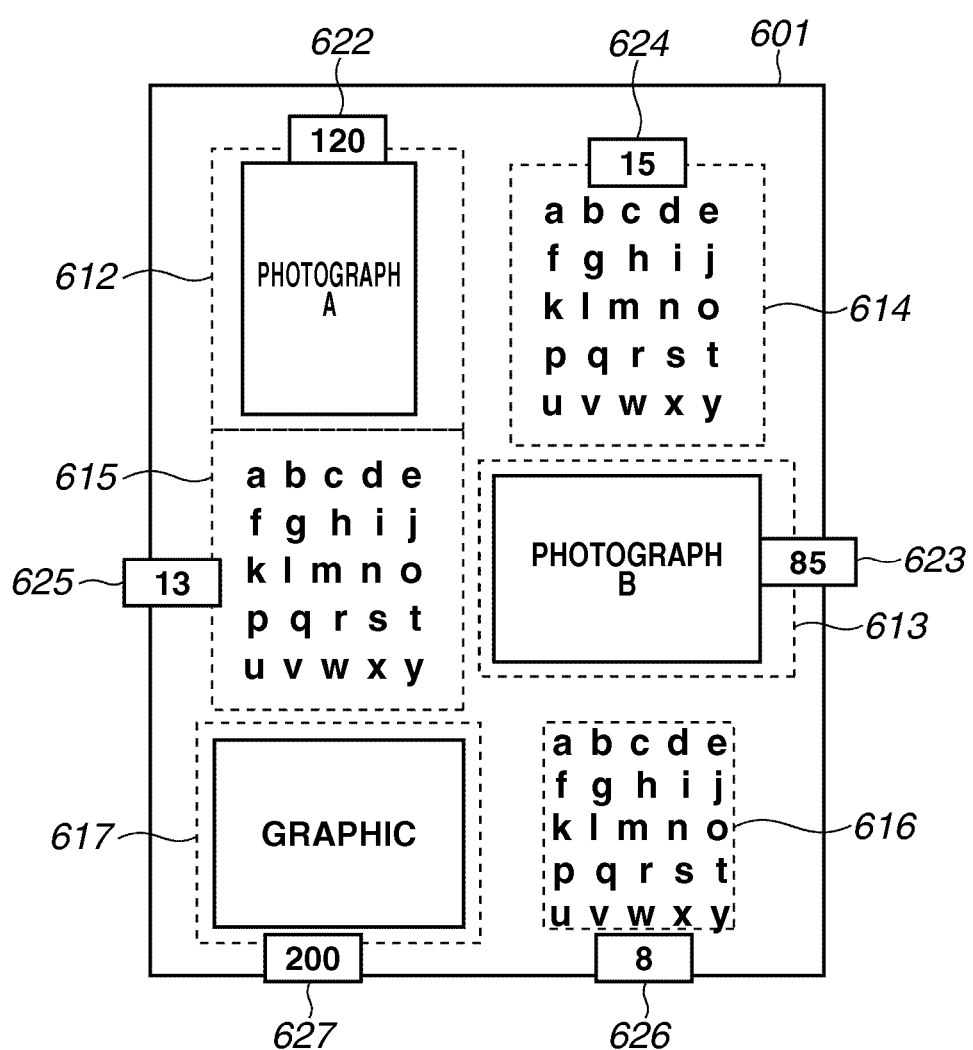
FIG. 7 illustrates an example of a display according to the present invention.

FIG. 7 illustrates a display example of a preview image generated by a printer driver which has received the print command from the application. This display corresponds to an example in which the various types of information in step S507 in FIG. 5 are displayed. In FIG. 7, since the data is displayed using the reversely converted RGB data based on the CMYK data analyzed for each ink, a photograph A 612, a photograph B 613, and a graphic 617, especially, may be displayed in slightly different colors than the application in FIG. 6. The example illustrated in FIG. 7 includes object frames 612, 613, 614, 615, 616, and 617 which respectively represent areas for the six types of objects 602, 603, 604, 605, 606, and 607 which are separated by analyzing the whole image.

FIG. 7 also includes ink used amount indications 622, 623, 624, 625, 626, and 627 which respectively indicate the used amount of ink in the six object frames 612, 613, 614, 615, 616, and 617. The indicated ink used amount values may be obtained by any of the following methods: i) a method for indicating the ink used amount as a percentage of when only each of the objects is printed based on a total ink used amount of 100 when the whole image is printed; ii) a method for indicating the ink amount actually used by each object as a ratio based on a standard ink used amount when printing is performed with the attributes of each object and in the size of each object; iii) a method for indicating as a value obtained by dividing an absolute value of the ink amount actually used by a predetermined value; and iv) a method for converting the ink used amount of each object into a monetary amount so that the user can specifically see the cost.

Returning to FIG. 5, in step S508, it is determined whether the user changes the ink used amount for each object.

Figure 8:
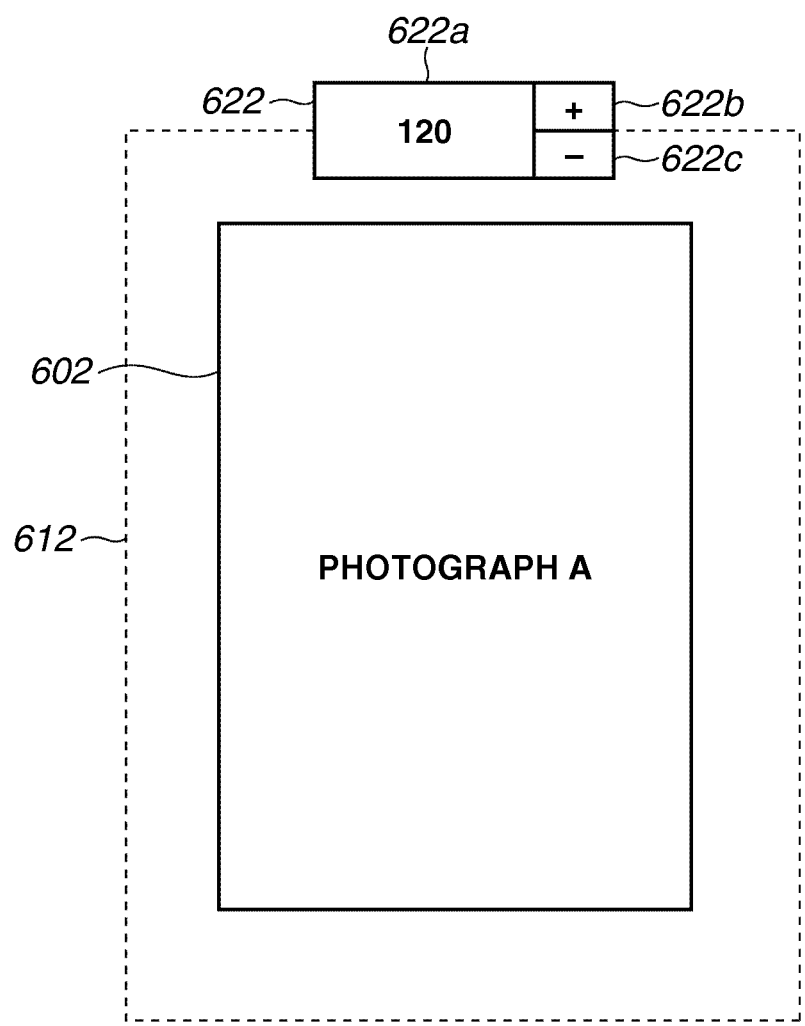
FIG. 8 is a partial enlarged view in FIG. 7.

A change user interface will be described based on FIG. 8. FIG. 8 is an enlarged view of the object 602, the object frame 612, and the ink used amount indication 622 of the photograph A in FIG. 7. The ink used amount indication 622 has an interface in which a value can be displayed and a used amount change value can be set. In FIG. 8, a user interface 622a receives a value input, a user interface 622b moves the value input in a plus direction, and a user interface 622c moves the value input in a minus direction. The user can change a value setting using one of the user interfaces 622a, 622b, or 622c. However, in FIG. 8, since the ink used amount of the photograph A is "120", it is necessary to restrict so that the value input cannot be set to more than "120". In other words, the system is configured so that the user can freely input a value from "0" to "120".

Returning to FIG. 5, if the user wishes to change the ink used amount (YES in step S508), then in step S509, the thinning processing is performed on an change instruction object based on an change instruction ink used amount. If the ink used amount before the thinning processing is "Total_Ink", and the ink used amount after the setting change is "Change_Ink", C'' (x, y), M'' (x, y), Y'' (x, y), and K'' (x, y) for the coordinates (x, y) after the thinning processing are calculated as follows.

$$C''(x,y) = (\text{Change\_Ink}/\text{Total\_Ink}) \times C'(x,y))$$

$$M''(x,y) = (\text{Change\_Ink}/\text{Total\_Ink}) \times M'(x,y))$$

$$Y''(x,y) = (\text{Change\_Ink}/\text{Total\_Ink}) \times Y'(x,y))$$

$$K''(x,y) = (\text{Change\_Ink}/\text{Total\_Ink}) \times K'(x,y))$$

In step S510, an image preview for display is created by creating an image after the thinning processing, and reversely converting the created image into RGB data based on the calculated C", M", Y", and K". In step S511, the image preview of the changed object is displayed on the monitor.

Figure 9:
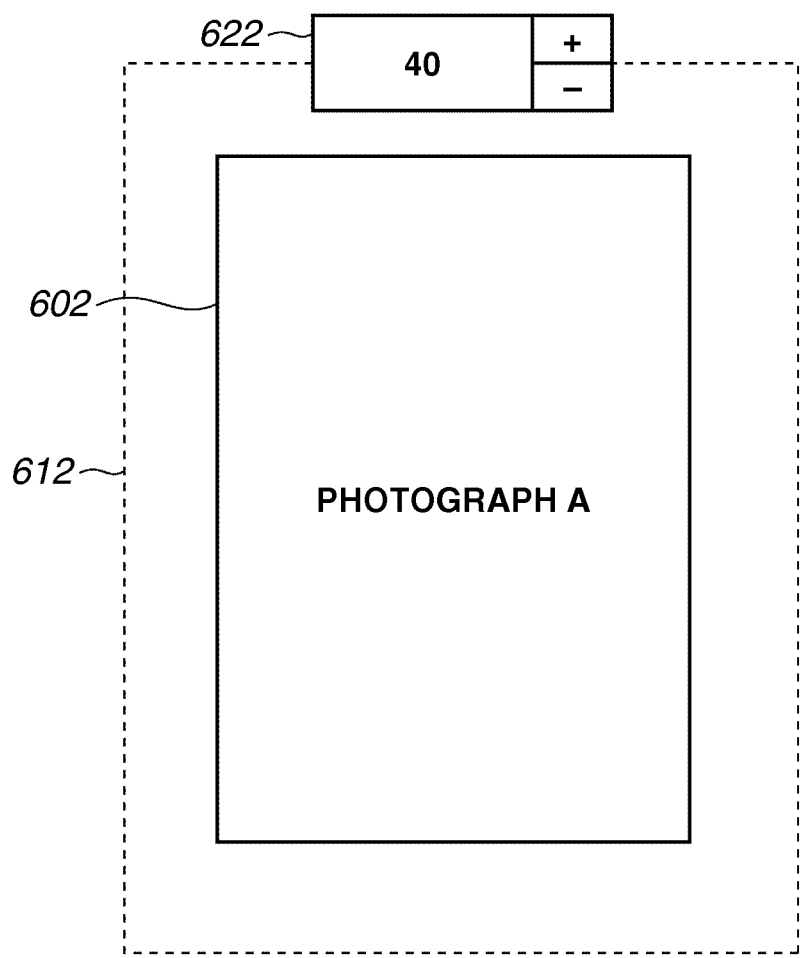
FIG. 9 illustrates an example of the partial enlarged view in FIG. 7 after setting is performed.

FIG. 9 illustrates a display example of a changed object. In this example, the user has changed the setting for the ink amount to be used in the photograph A 602 from "120" to "40". Consequently, C", M", Y", and K" are each thinned (reduced) by a 1/3 ratio by reducing the ink used amount of the photograph A 602 by 1/3. The photograph A 602 in FIG. 9 is displayed as an image in which thinning processing is performed in conjunction with the setting to reduce the ink used amount.

Figure 10:
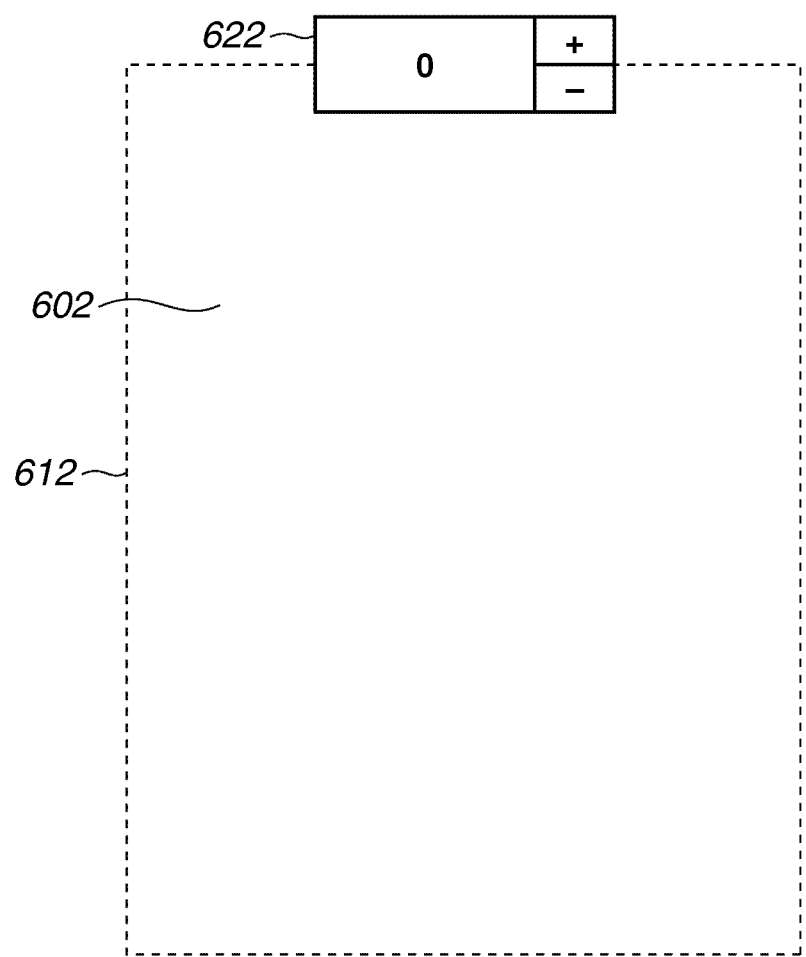
FIG. 10 illustrates an example of the partial enlarged view in FIG. 7 after setting is performed.

FIG. 10 illustrates an example in which the ink amount to be used is changed to a setting of "0". When the ink amount is set to "0", since nothing is printed in that area, the display of the object also disappears.

The "0" setting of the ink used amount is a very convenient function for the user, as this setting allows the user to freely erase a local print object by the printer driver even for an application in which trimming is not possible.

Returning to FIG. 5, in step S512, for a changed object, quantization processing is performed on the C", M", Y", and K" values of after the thinning processing, and for a non-changed object, the quantization processing is performed on the C', M', Y', and K' (or, C", M", Y", and K" with a thinning amount of 0) values. Then, the processing proceeds to step S513, in which print processing is realized.

In the above, an example is described of a method in which the present exemplary embodiment is realized by the printer driver. However, most of the processing can also be performed by the application software. In such a case, a calculation result of the ink amount on the printer side needs to be transmitted to the application software side.

As described above, according to the present exemplary embodiment, an image processing apparatus can be realized which enables a user to incur printing costs only for the necessary information and the necessary areas in a print product. Further, since the print quality as an output product when the color materials are saved on can be estimated, an optimum print setting can be set based on the balance between the finished image quality and cost.

Figure 11:
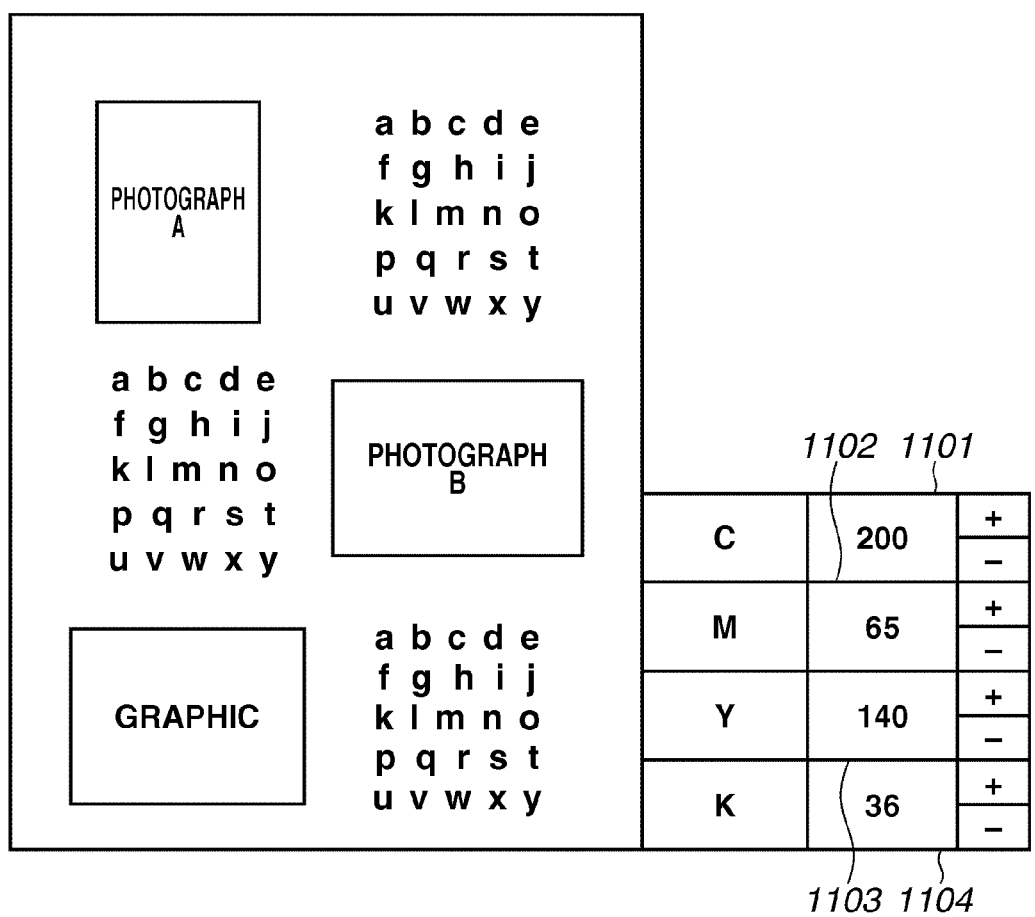
FIG. 11 illustrates an example of a display according to the present invention.

FIG. 11 illustrates a second exemplary embodiment. In FIG. 11, an example of a user interface is illustrated in which, rather than displaying and changing a spatial local ink used amount, the ink amount of each color in the whole image is displayed and changed for each ink type. In this case, the image analysis unit 303 analyzes information about the types of ink (color material) to be used during printing of the image data based on image information obtained by rasterizing print data into image data. In this example C, M, Y, and K inks are used. In FIG. 11, values in columns 1101, 1102, 1103, and 1104 respectively represent the C, M, Y, and K ink used amounts. In these columns, values can be input and changed by dialing in a plus or minus direction in a similar manner to the first exemplary embodiment. Consequently, the ink used amount which can be saved on while reflecting the user's preference. For example, the user can perform printing with a reduced used amount for an ink which has a low remaining ink amount.

Figure 12:
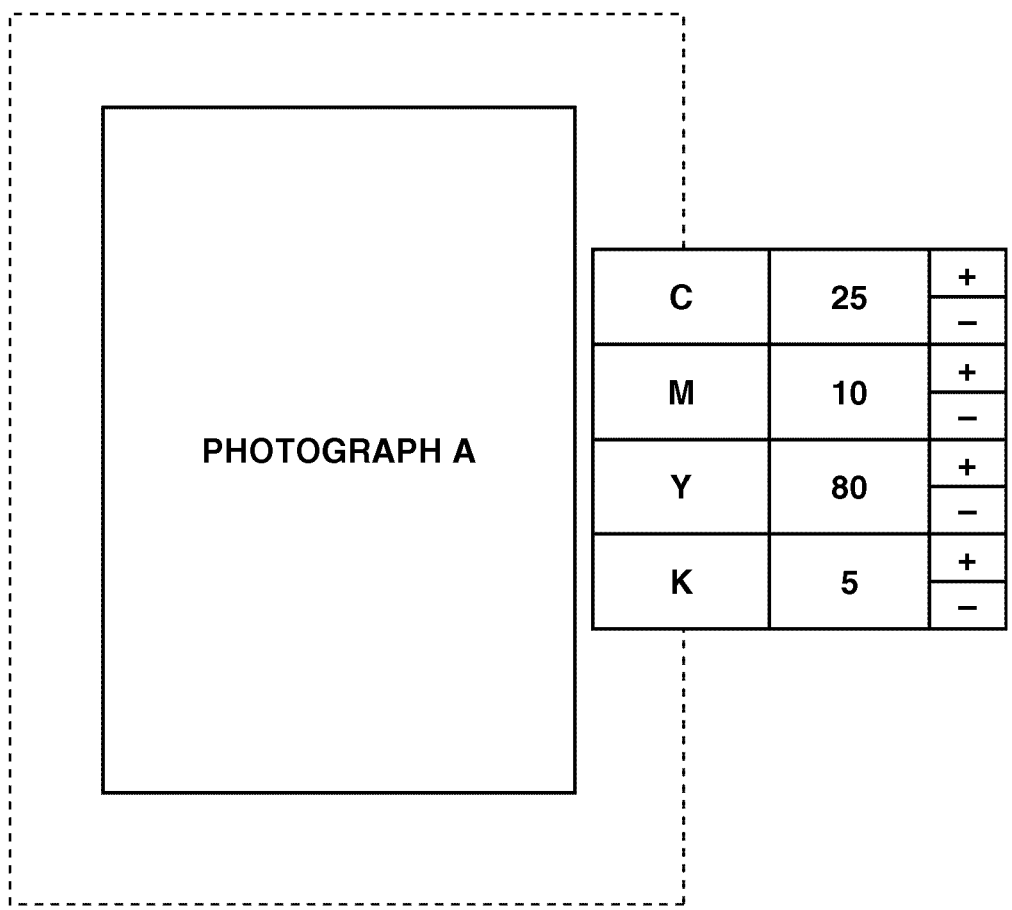
FIG. 12 illustrates an example of a display according to the present invention.

FIG. 12 illustrates a third exemplary embodiment. In FIG. 12, an example of a user interface is illustrated in which the used amount for each ink is displayed and changed for each object. FIG. 12 is an enlarged view of the object portion of the photograph A 602 of the print image in FIG. 6. With this user interface, the savings for each ink can be set in more detail than in the example illustrated in FIG. 11.

Figure 13:
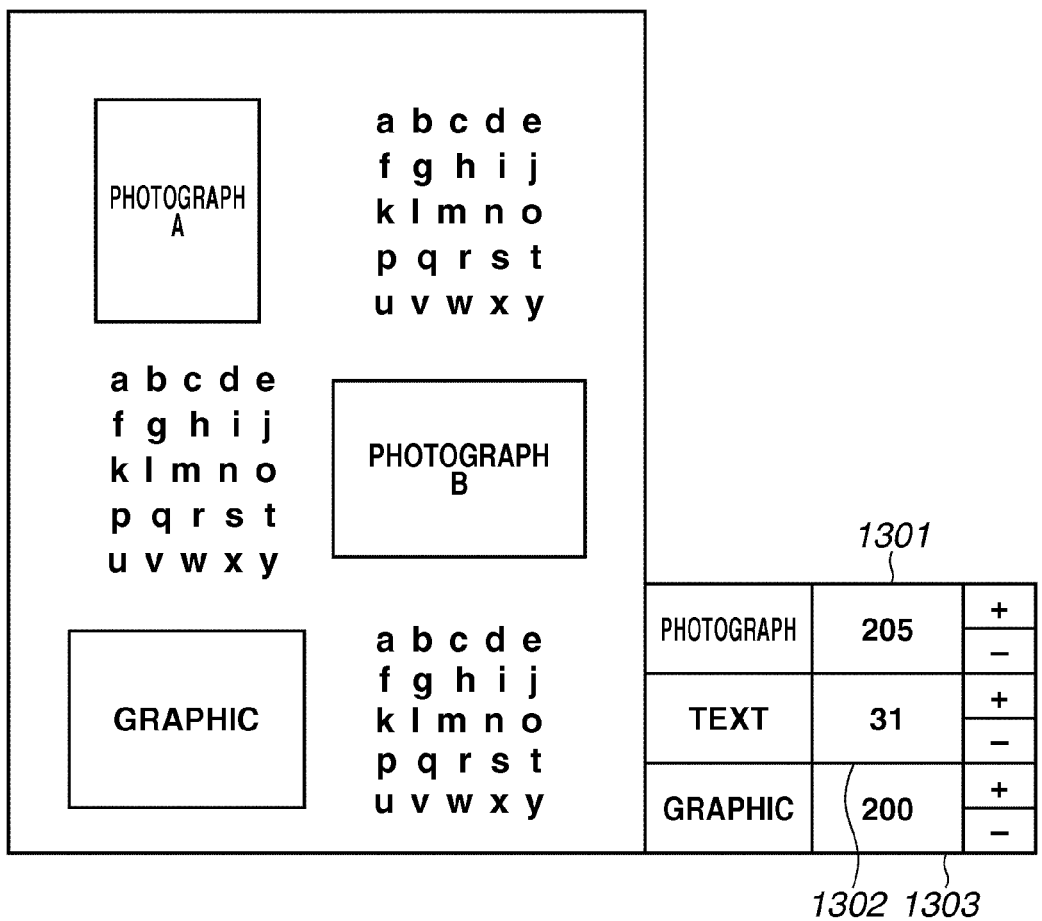
FIG. 13 illustrates an example of a display according to the present invention.

FIG. 13 illustrates a fourth exemplary embodiment. In FIG. 13, an example of a user interface is illustrated in which the ink used amount is displayed and changed for each "photograph", "text", and "graphic" object obtained from the results of classifying the whole image. With this interface, the user can easily set the level of priority given to each object. Consequently, for all the objects having the "photograph" attribute (photographs A and B), the ink used amount can be set by changing a value in a column 1301. Further, for all the objects having the "text" attribute, the ink used amount can be set by changing a value in a column 1302. Moreover, for all the objects having the "graphic" attribute, the ink used amount can be set by changing a value in a column 1303.

In the above, display of the color material used amount in a print product and changing the used amount for each partial constituent element were described. However, the present invention is also effective in a standalone copying apparatus which does not use a host computer. In such a case, a configuration may be used which provides a user with display for setting using a display panel mounted on an externally-connected monitor or the copying apparatus.

Further, although the display and change settings of the color material used amount for various constituent elements such as spatial coordinate units, color material units, and object units are described as the constituent elements constituting the print information, other constituent elements may also be used. The important point is that the configuration enables the user to comprehend the used amount of ink for each separated constituent element, and set the weighting for each element.

Further, the present invention can also be achieved by supplying a storage medium on which the program code of software for realizing the functions of the above exemplary embodiments is stored to a system or an apparatus, and having a computer (or a CPU or a micro processing unit (MPU)) of the system or the apparatus read and execute the program code stored in the storage medium. In this case, the program code itself read from the storage medium realizes the functions of the above exemplary embodiments, so that the program code and the storage medium on which the program code is stored constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-119683 filed May 18, 2009, which is hereby incorporated by reference herein in its entirety.

What is claimed is:

1. An image processing apparatus comprising:
    an analysis unit configured to analyze attributes in a print image;
    a separation unit configured to separate the print image into a plurality of object areas based on the attributes analyzed by the analysis unit;
    a display unit configured to display information about a color material used amount to be used in printing for each of the separated object areas; and
    a setting unit configured to allow a user to set a change in the color material used amount for each of the separated object areas.

2. The image processing apparatus according to claim 1, further comprising an image display unit configured to display an image according to the color material used amount set by the setting unit.

3. The image processing apparatus according to claim 1, wherein each of the separated object areas has an attribute analyzed by the analysis unit which is either one of text, photograph and graphic.

4. The image processing apparatus according to claim 1, wherein
- a separated object area the color material used amount of which has been changed to zero by the setting unit is not printed.

5. A method for image processing comprising:
- analyzing attributes in a print image:
- separating the print image into a plurality of object areas based on the analyzed attributes;
- displaying information about a color material used amount to be used in printing for each of the separated object areas; and
- setting a change in the color material used amount for each of the separated object areas.

6. A non-transitory computer-readable recording medium on which a program is recorded, the program comprising:
- analyzing attributes in a print image;
- separating the print image into a plurality of object areas based on the analyzed attributes;
- displaying information about a color material used amount to be used in printing for each of the separated object areas; and
- setting a change in the color material used amount for each of the separated object areas.

* * * * *